United States Patent Office 3,251,333
Patented May 17, 1966

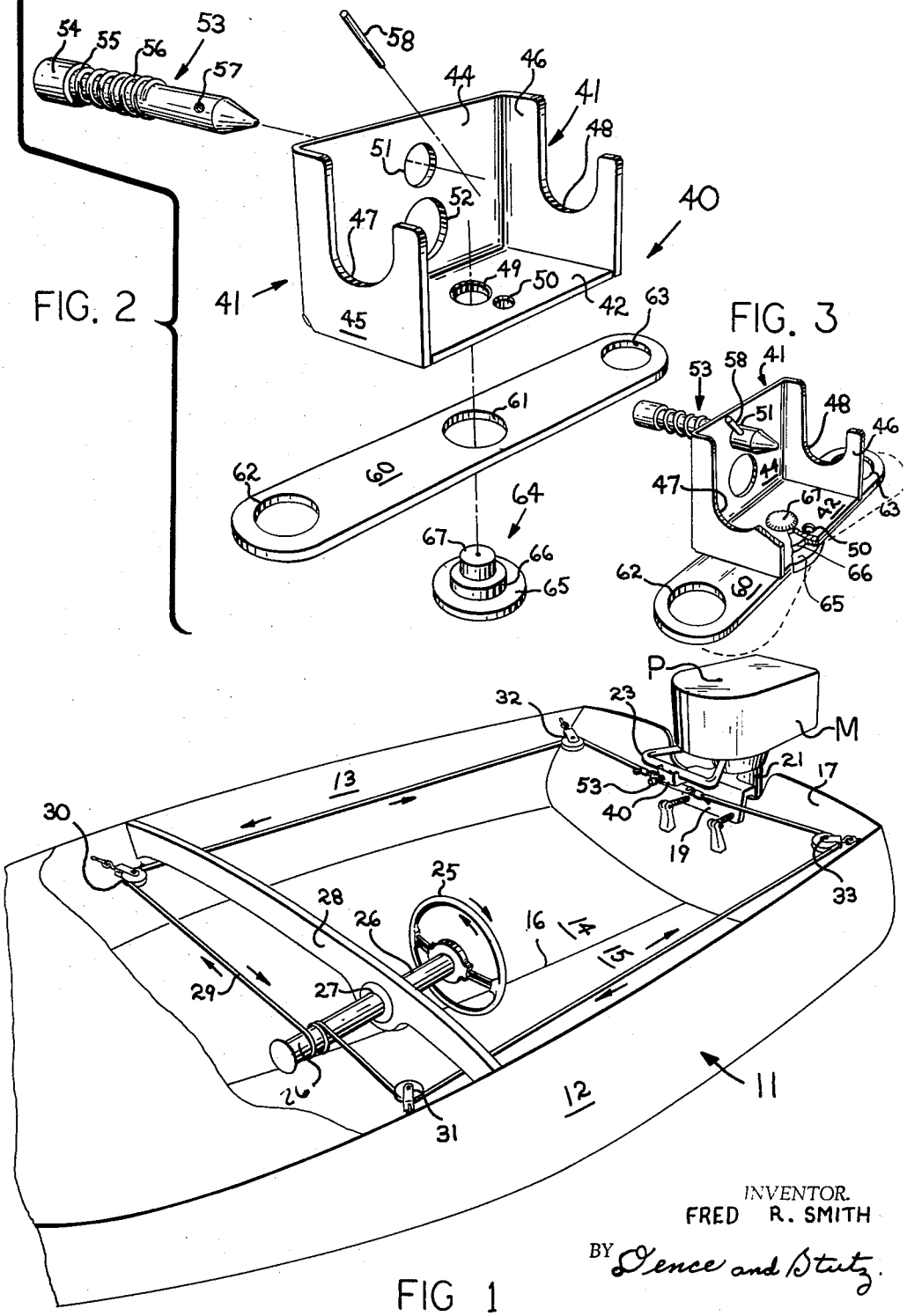
May 17, 1966 — F. R. SMITH — 3,251,333
OUTBOARD MOTOR STEERING BRACKET
Filed Aug. 10, 1964 — 2 Sheets-Sheet 1
INVENTOR.
FRED R. SMITH
BY Dence and Stutz
ATTORNEYS

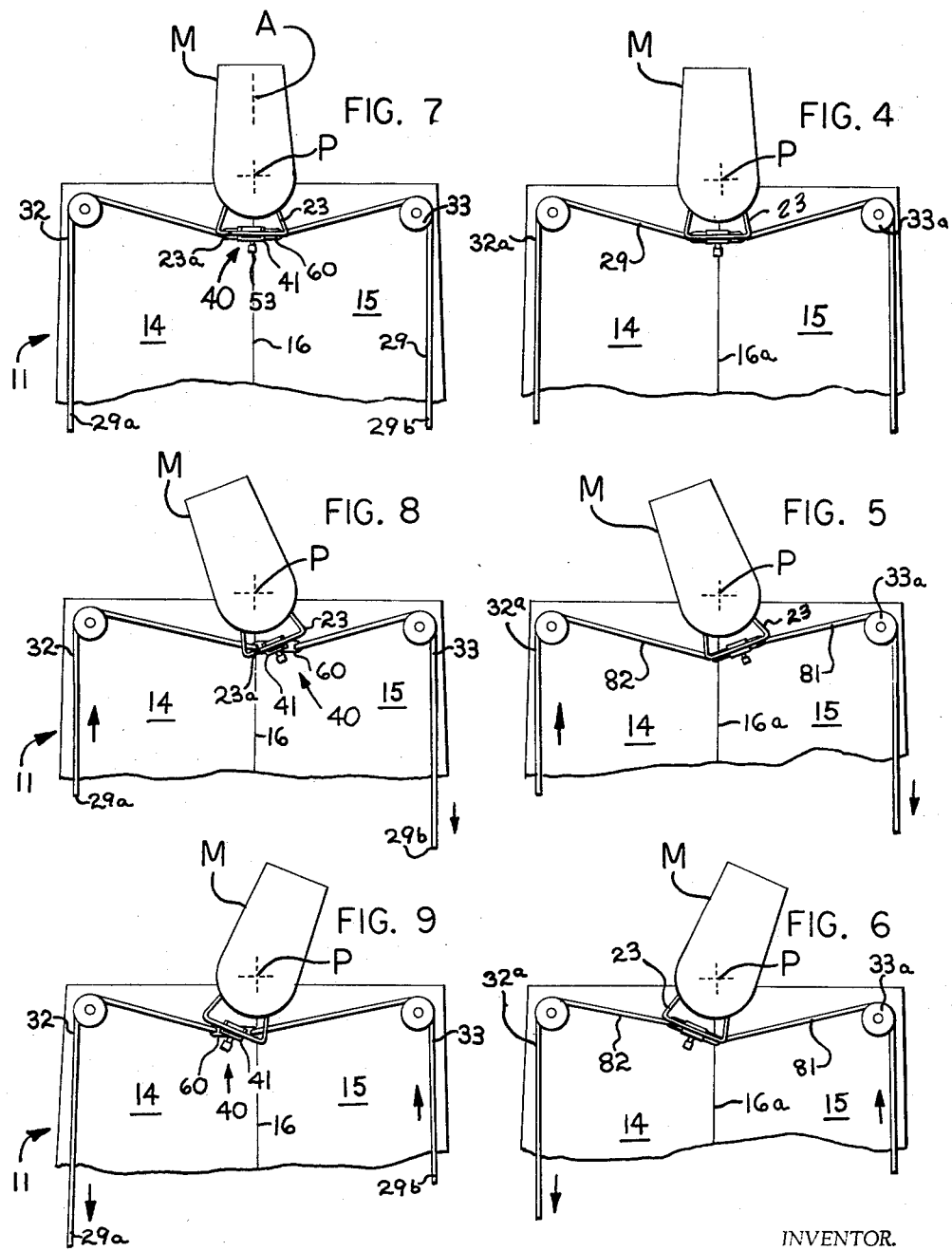

3,251,333
OUTBOARD MOTOR STEERING BRACKET
Fred R. Smith, 2124 Ontario St., Toledo, Ohio; Dorothy G. Smenner, administratrix of said Fred R. Smith, deceased
Filed Aug. 10, 1964, Ser. No. 388,414
1 Claim. (Cl. 115—18)

The present invention relates generally to watercraft, e.g., boats, and, more particularly, those boats powered by an outboard motor. Even more particularly, the present invention relates to a bracket for securing steering cables to the outboard motor, whereby the boat may be more efficiently steered from a position remote from the motor. The bracket of the present invention represents an improvement in the securement of steering cables to an outboard motor.

It is an object of the present invention to provide a bracket which is of extremely simple construction and is adapted for securing steering cables to a pivotably mounted outboad motor.

It is another object of the present invention to provide a bracket which provides for even tension in the separate cables; the latter being connected to a forward located steering control, such as a wheel or the like.

It is still another object of the present invention to provide a bracket construction which, by means of its novel functioning, provides very positive, yet controllable steering of the watercraft powered by an outboard motor.

It is yet another object of the present invention to provide a steering arrangement employing the novel bracket of the present invention, whereby the steering is of uniform character and is noted for the absence of creep when the control mechanism, e.g., the wheel, is once set for a given degree of turn.

In conventional steering arrangements, the cables are secured to the motor by a relatively rigid connection whereby, when a turn is attempted, the whole arrangement is such that the motor tends to return to the neutral position. Furthermore, in conventional arrangements, the turning force is considerably variable depending upon the sharpness of turn being attempted. This is further evident in that the tension in the one steering cable will vary with the tension in the other steering cable, whereby the accuracy of any turning maneuver is appreciably lessened.

It is an overall object of the present invention to provide a steering arrangement and particularly a novel bracket construction which overcomes the above difficulties.

The foregoing general and specifically enumerated objects of the present invention will become apparent to those skilled in the art from the following detailed description taken in conjunction with the annexed sheets of drawings on which there are presented, for purposes of illustration only, a single embodiment of the present invention.

In the drawings:

FIG. 1 is a perspective view of a boat with portions broken away to show schematically a steering cable-steering wheel arrangement connected to a motor by means of a bracket of the present invention.

FIG. 2 is an exploded perspective view of the several components which make up the bracket of the present invention.

FIG. 3 is a perspective view similar to FIG. 2 but showing the components in their assembled relationship.

FIGS. 4, 5 and 6 are schematic top plan views, partially broken away, of a conventional steering cable arrangement illustrated in different positions and including an arrangement for securement to the handle of the outboard motor.

FIGS. 7, 8 and 9 are views similar to FIGS. 4, 5 and 6 but wherein therein is employed a steering cable bracket in accordance with the present invention.

Viewed most simply, the steering bracket of the present invention is composed of a clamp member adapted for clamping securement to the outboard motor, usually at the U-shaped forwardly projecting handle member, and a linear yoke member pivotably attached to the clamp for rotation about a vertical axis and in a horizontal plane; the yoke including attachment means at either end for affixment of the steering cables.

The invention will be more clearly understood by reference to the drawings and the following description in which reference will first be had to FIG. 1, wherein there is disclosed a boat 11 defined by spaced side walls 12 and 13 connected at the bottom by floor or deck panels 14 and 15 meeting at the center beam 16 defining the longitudinal axis of the boat. The side panels 12 and 13 are connected at their aft end by a stern bulkhead 17, to which is secured an outboard motor M.

The motor M is secured to the rear bulkhead 17 by a C-clamp arrangement 19 which is integrally part of the motor. As is well known, a drive shaft 21 depends from the motor down into the water and, at its extremity, there is rotatably secured a propeller providing a driving force for moving the boat forward and as well steering same. The motor M pivots about an axis P. The motor pivots easily by hand movement of the handle 23 or by the steering wheel 25 axially mounted on a steering axle 26 journally mounted as at 27 in forward bulkhead 28. The steering wheel shaft or axle 26 has a steering cable 29 wrapped several turns thereabouts and the cable proceeds in a lateral direction about pulley 30 on the right hand side of the boat and a pulley 31 on the left hand side. The cable then proceeds rearwardly on the right to a pulley 32 and thence laterally along the bulkhead 17 to connect with the bracket 40 of the present invention. On the left, the cable proceeds rearwardly to a pulley 33 and thence about along the rear bulkhead 17 to the bracket 40. The pulleys 30, 31, 32 and 33 are each rotatably mounted in a bifurcated member or fork physically secured to the body panels of the boat as shown. The movement of the steering wheel 25 in either direction as shown by the arrows causes a corresponding movement in the control cable which causes a corresponding movement in the cable as it proceeds along the side walls. The movement of the wheel in one direction will cause the cable along the side wall 13 to move in one direction, while the cable along the wide wall 12 will move in the opposite direction. As can be seen, this relative movement of the cable will cause the motor M to pivot about the axis P (FIGS. 7, 8 and 9) thereby changing the attitude of the propeller (which is fixed with respect to the motor) with respect to the longitudinal axis which corresponds to the central beam 16.

The details of the construction of the bracket 40 will be more clear from the illustration in FIGS. 2 and 3. The bracket, generally designated as 40, includes a clamp member 41 formed of a single piece of metal cut and formed to define a bottom horizontal wall 42 having a connected vertical upstanding wall 44. From each end of the wall 44 there extends integrally formed side walls 45 and 46 which are bent over into normal relationship with the vertical wall 44 and thereby lying also vertical or normal to the horizontal bottom wall 42. The side walls 45 and 46 are provided with congruent upwardly opening U-shaped cutouts 47 and 48, respectively. The bottom wall panel includes two holes 49 and 50, while vertical wall 44 is provided with holes 51 and 52. The hole 51 in panel 44 is of a size to slidably receive stud pin 53 having a knurled cap end 54 defining a stop collar 55 for spring 56. The pin includes a transverse bored hole 57 adapted to receive a lock pin 58. The components as just described permit the clamp assembly 40 to be firmly but removably secured to the handle 23. Thus, the contour of the cutouts 47 and 48 are such as to engage the handle 23, while the pin 53 extends through the hole 51 and the clamp 41 and thence through a corresponding lock hole (not shown) in the handle. This hole is usually slotted, although not shown, to accommodate the end extremities of the pin 58 whereupon a turn of the knurled cap 54 as the spring is compressed will lock the clamp member 41 in engagement with the handle. The foregoing is a fairly conventional arrangement for securing a clamp to another member by the handle of the motor M.

The bracket 40, in addition to the clamp 41, is composed of a linear link member or yoke 60 which is provided with a central hole 61 and, additionally, holes 62 and 63 in its end extremities. The yoke 60 is rotatably attached to the bottom wall 42 of clamp 41 by means of the stud 64. This stud 64, as viewed in FIG. 2, includes a flared flange end 65 and intermediate cylindrical portion 66 and an upper reduced-size end portion 67. The intermediate flared portion 66 has a diameter adapted to be slidingly received in the hole 61 in the yoke 60. The yoke is assembled onto the clamp by simply locating the hole 61 and the hole 49 in the bottom wall 42 in registry and pushing the stud 64 through it so that the upper end 67 projects slightly thereabove. This assembly is then secured together by flaring out the upper end portion 67 in any suitable manner. The intermediate portion 66 has an axial thickness generally corresponding to the thickness of the yoke 60, whereupon the yoke member on the flange cap 65 is free to pivot with respect to the clamp portion 41. The holes 62 and 63 in the outer extremity provide securement of the terminal ends of the steering cable 29. The pivotable relationship between the yoke 60 and the clamp 41 is further shown in FIG. 3. In solid line outline the yoke is shown in alignment with the bottom wall 42 and, of course as a consequence, in alignment with the handle 23 as shown in FIG. 1. The yoke is also shown in dotted outline in its permissive angular relationship with respect to the clamp 41.

The novel features provided by the bracket construction in accordance with the present invention are best shown in FIGS. 7–9. In FIG. 7, the longitudinal axis A (dotted line) of the motor M is in line with the longitudinal axis (beam 16) of the boat. The motor M as mounted pivots about the point P which lies to the rear of the handle 23; the horizontal portion 23a of which has mounted thereon the bracket 40 of the present invention by means of the clamp 41 and lock pin 53. The tension in the steering cable 29 is even, as illustrated schematically by the similar length of the cable identified by the reference numerals 29a and 29b. With the steering bracket and cables in the positions shown the actuation of the motor M will urge the boat forwardly. In FIG. 8 the motor, bracket and cables are shown in relative position after the operator, although not shown, has turned the steering wheel, not shown, to the right. As a consequence, segment 29b of the steering cable moves forward while segment 29a of the steering cable moves to the rear so that the handle portion of the motor pivots about point P moving in the direction of pulley 33. The forward portion 23a of the handle 23 is now angularly disposed as is the clamp 41. The yoke 60, however, by reason of the construction as described, remains in aligned relationship with the horizontal extent of the steering cable between pulleys 32 and 33. In FIG. 9, just the opposite turning conditions has been effected by the operator turning the steering wheel to the left whereupon the segment 29b of the steering cable moves rearwardly in the direction of the arrow, while segment 29a of the steering cable 29b moves forwardly. Thus causes the handle portion 23a of the motor M to pivot on P moving toward pulley 32. However, the yoke 60 still retains its aligned relationship with the horizontal portions of the control cable between pulleys 32 and 33 whereas the clamp portion 40 being affixed securely to the handle must move with it.

FIGS. 4, 5 and 6 illustrate the movement of the steering cables in the conventional arrangement for attachment thereof to the handle portion of the motor. Thus, in FIG. 4 we see that the horizontal run of the control cables between the pulleys 33a and 32a is in straight aligned relationship. However, when the control cable on the one side is moved by reason of the turning of the steering wheel, the horizontal portions of the steering cable, e.g., for example, identified by the reference numerals 81 and 82, are no longer in aligned relationship. The opposite turning and its effect on the control cable is shown in FIG. 6. As can be appreciated by the illustrations in FIGS. 4 and 6, the steering cable in normal installations is necessarily possessed of a variable tension, depending upon the degree of turn imparted. This results in a torque action on the motor. This variable tension creating the torque condition is undesirable since, in the absence of continued pressure to meet the torque, the components will tend to return to a no torque condition or neutral position wherein the tension on each side, e.g., 81 and 82, will be the same. This automatically results in a gradual change in heading of the craft, sometimes referred to as "creep."

In contrast, with the bracket arrangement provided in accordance with the present invention, the tension remains relatively constant in the steering cable whereby, once the wheel has been turned to pivot the motor about the point P, the motor will tend to remain in that position without maintained pressure on the wheel. Headings of the craft are thus more uniformly maintained and more easily maintained.

As can be seen from FIGS. 2 and 3, the bracket of the present invention is relatively simple and can be fabricated conveniently of a metal such as steel. The device is very easily affixed onto the handle of the conventional outboard motor; the handle being usually provided with a slotted hole for attachment of a conventional bracket to which is secured the terminal ends of the steering cables.

The hole 50 in the bottom wall 42 of the clamp member 41 permits introduction of oil or any suitable lubricant to the area of contact between the upper surface of the yoke member 60 and the lower surface of the wall 42 of the bracket.

It will be appreciated that the bracket may be fabricated in different sizes and that the dimensional relationship of the several components may be varied to meet the needs of the particular installation, depending upon, for example, the positioning of the cable, the size of the motor, the type of handle thereon and the like. In some instances the yoke 60 may be desirably of a longer dimension with respect to the clamp component 41 than is shown in FIG. 2 or 3.

Modifications may be resorted to without departing from the spirit and scope of the present invention as defined in the appended claim.

I claim:

Steering cable tensioning device for outboard motor driven remote steering combination wherein said cables relay the desired pull imparted by the operator to the steering mechanism to the motor to thereby pivot same to change the attitude of the depending propeller with respect to the longitudinal axis of the boat, said device comprising a clamp member including spaced parallel end walls, a back wall connecting said end walls, and bottom wall normal to both end walls and back wall, said back wall including a hole receptive of a spring loaded lock pin; said end walls including matched curved notches for snug reception of the handle of said outboard motor; whereby said lock pin securely but removably connects said clamp to the handle, said device further comprising an elongated swivel arm plate rotatably secured at its center to said bottom wall for pivotal movement of said arm in a horizontal plane, said arm having means on its extremities for securement of said cables.

References Cited by the Examiner

UNITED STATES PATENTS

| | | | |
|---|---|---|---|
| 2,726,622 | 12/1955 | Daniels | 114—153 |
| 2,949,093 | 8/1960 | Smith | 115—18 |
| 2,981,222 | 4/1961 | Cunefare | 115—18 |

MILTON BUCHLER, *Primary Examiner.*

A. H. FARRELL, *Assistant Examiner.*